US012762090B2

(12) United States Patent
Wei

(10) Patent No.: US 12,762,090 B2
(45) Date of Patent: Oct. 13, 2026

(54) LOCAL LARGE LANGUAGE MODEL EMBEDDING SEARCH

(71) Applicant: SAP SE, Walldorf (DE)

(72) Inventor: Wenbo Wei, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/971,714

(22) Filed: Dec. 6, 2024

(65) Prior Publication Data

US 2026/0161602 A1 Jun. 11, 2026

(51) Int. Cl.
*G06F 16/14* (2019.01)
*G06F 8/10* (2018.01)

(52) U.S. Cl.
CPC .............. *G06F 16/148* (2019.01); *G06F 8/10* (2013.01); *G06F 16/156* (2019.01)

(58) Field of Classification Search
USPC .......................................................... 707/722
See application file for complete search history.

(56) References Cited

PUBLICATIONS

Zhao et al. Retrieval-Augmented Generation for AI-Generated Content: A Survey. arXiv:2402.19473.v6. Jun. 2024, pp. 1-22. (Year: 2024).*
Software Requirement Specification (SRS) Format. 2023, pp. 1-7. https://www.geeksforgeeks.org/software-engineering/software-requirement-specification-srs-format/ (Year: 2023).*
A Comprehensive Guide to Latent Space. Dec. 2023, pp. 1-9. https://samanemami.medium.com/a-comprehensive-guide-to-latent-space-9ae7f72bdb2f (Year: 2023).*
RAGAS for RAG in LLMs: A Comprehensive Guide to Evaluation Metrics. Aug. 2024, pp. 1-14. https://dkaarthick.medium.com/ragas-for-rag-in-llms-a-comprehensive-guide-to-evaluation-metrics-3aca142d6e38 (Year: 2024).*
Bartram. Building a Gen AI Application with RAG: Key Considerations for Data Sensitivity and Storage. Oct. 2024, pp. 1-8. https://blogs.vmware.com/cloud-foundation/2024/10/23/building-a-gen-ai-application-with-rag-key-considerations-for-data-sensitivity-and-storage-2/ (Year: 2024).*
Gupta et al. Enhancing user prompt confidentiality in Large Language Models through advanced differential encryption. Computers and Electrical Engineering 116, 109215, Apr. 2024. (Year: 2024).*
Yang et al. On the Power of Semantic Partitioning of Web Documents. IIWEB'03, pp. 39-44. (Year: 2003).*

* cited by examiner

*Primary Examiner* — Baoquoc N To
(74) *Attorney, Agent, or Firm* — SCHWEGMAN LUNDBERG & WOESSNER, P.A.

(57) ABSTRACT

In an example embodiment, a solution is provided that combines the precision of a database approach with the commonsense/smart approach of an LLM. Documents, such as Jira™ items, are each bound with a unique identification upon ingestion. The unique identification is used as a high-dimensional index to facilitate efficient search operations. Additionally, a local LLM model is used to process and analyze the data, which ensures that all data processing is kept locally. This helps prevent data exposure of confidential data contained in the files to external systems or networks. Finally, a secondary embedding search mechanism is implemented before presenting results to the user. The query is run more than once, and the outputs can then be compared. The results are only displayed if the match rate among the sets exceeds a predefined threshold. This enhances the precision of the LLM results, minimizing the risk of LLM-generated illusions or inaccuracies.

20 Claims, 4 Drawing Sheets

LOCAL LARGE LANGUAGE MODEL EMBEDDING SEARCH

TECHNICAL FIELD

This document generally relates to computer systems. More specifically, this document relates to use of large language models.

BACKGROUND

In the realm of knowledge management, especially in environments where confidential documents are involved, there is a need for efficient categorization, summarization, and retrieval of information.

BRIEF DESCRIPTION OF DRAWINGS

The present disclosure is illustrated by way of example and not limitation in the FIGURES of the accompanying drawings, in which like references indicate similar elements.

DETAILED DESCRIPTION

Figure 1:
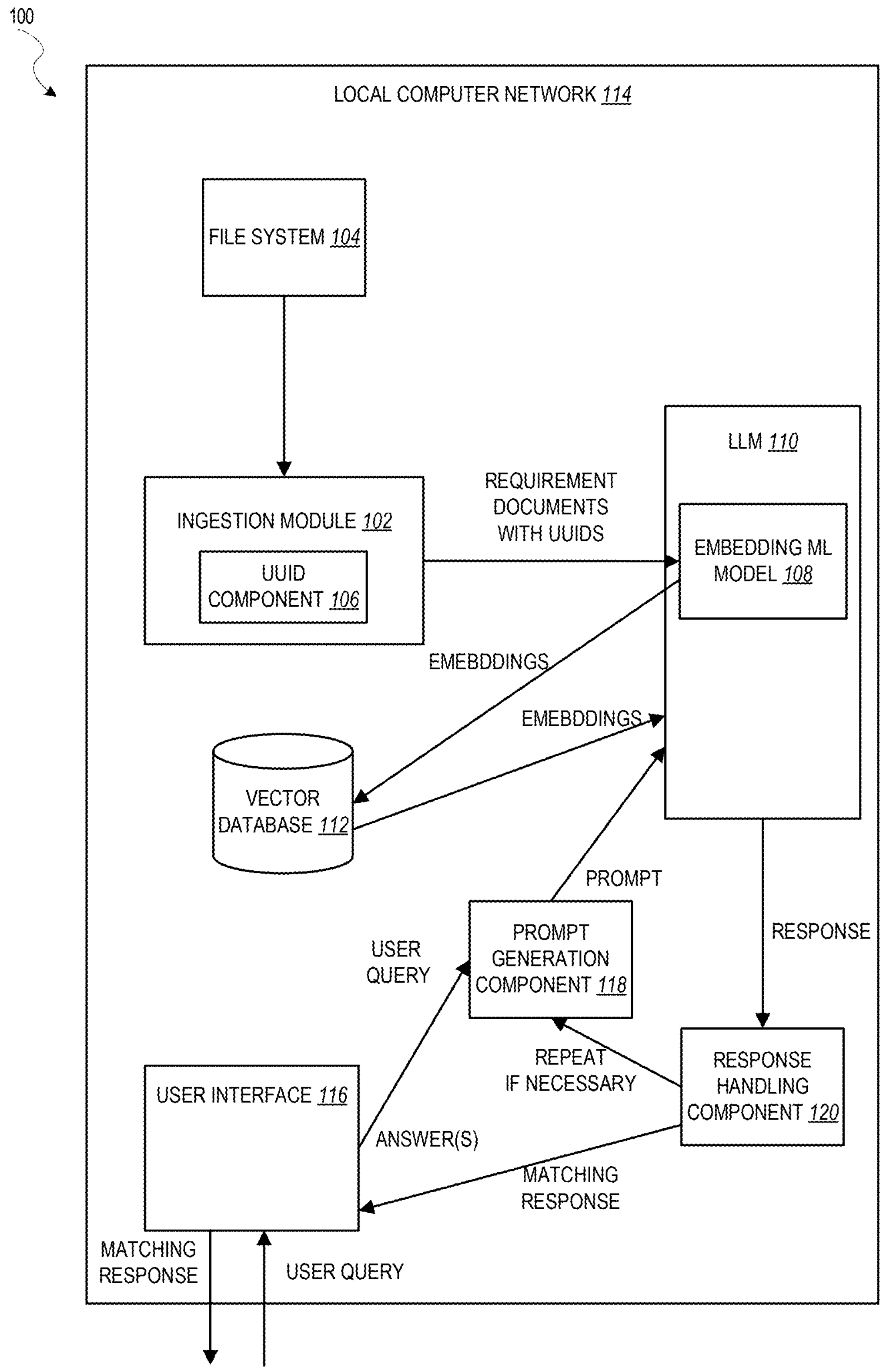
FIG. 1 is a block diagram illustrating a system for utilizing an LLM, for embedding searches in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Certain documents in a database may benefit from high-dimensional analysis. For example, in a software development system, there may be files that are used to plan, track, release, and support software development. An example of this are project files, such as project files written for Jira™, from Atlassian Corporation of Sydney, Australia. A Jira™ project file typically contains a project overview, detailed descriptions of functional and non-functional requirements of the project, categorization of the requirements based on priority, stakeholders, acceptance criteria, dependencies, and attachments/references to other relevant documents.

These project documents are filled with complex and diverse content, as there are often inputs from many different stakeholders. This makes analysis difficult and time-consuming.

Similarly, for a software developer, finding internal technical resources and determining which technical libraries are best for a specific requirement can be difficult and time-consuming.

One solution to these issues would be to use a Large Language Model (LLM) to identify and select relevant internal technical resources/libraries for a set of requirements specified for a software development project, such as requirements listed in a Jira™ project file.

LLMs are designed to learn patterns and relationships from data, allowing them to improve their performance over time. However, they are often designed to output different answers to the same or similar queries. This is because in many environments the diversity of the output is viewed as a desirable characteristic. If a user asks an LLM, for example, to generate a poem in a particular way, and then later asks the LLM again to generate a poem in that same particular way, it is assumed that the user may be looking for different results each time. Thus, LLMs are designed to select from a variety of different possible answers in a different way each time, so that a prompt submitted to the LLM multiple times, even by multiple users, results in a variety of different responses.

While that may be desirable in certain circumstances, when dealing with items such as database queries or database files, this type of variation in answers is actually a negative. When one makes, for example, a database query to a database, one expects a single response. For example, a structured query language (SQL) statement of "SELECT first_name from employees;" may be specifically requesting a list of first names of employees from an employee table. It would be expected that, short of the employee table changing, this list will be identical each time this SQL statement is made. Thus, the database response is very precise, but it requires specific knowledge of what to ask for and how to ask for it. An LLM, on the other hand, allows for a more commonsense/smart approach to the query, but LLMs do not have the level of precision and repeatability of answers that a database response would have.

In an example embodiment, a solution is provided that combines the precision of a database approach with the commonsense/smart approach of an LLM. Documents, such as Jira™ items, are each bound with a unique identification upon ingestion. The unique identification is used as a high-dimensional index to facilitate efficient search operations. Indexing in this manner reduces the need for repeated tokenization and vector matching when using an LLM, in future searches, and thus optimizes search efficiency and minimizes computational overhead by avoiding redundant processing steps. Additionally, a local LLM model is used to process and analyze the data, which ensures that all data processing is kept locally. This helps prevent data exposure of confidential data contained in the files to external systems or networks. Finally, a secondary embedding search mechanism is implemented before presenting results to the user. The query is run more than once, and the outputs can then be compared. The results are only displayed if the match rate among the sets exceeds a predefined threshold. This enhances the precision of the LLM results, minimizing the risk of LLM-generated illusions or inaccuracies.

FIG. 1 is a block diagram illustrating a system 100 for utilizing an LLM for embedding searches, in accordance with an example embodiment. An ingestion module 102 ingests a project file, such as a JIRA™ file, from a file system 104. The ingestion module 102 then identifies all of the requirements contained in the project file and forms a separate requirement document for each such requirement. The ingestion module 102 includes a Universally Unique Identifier (UUID) component 106 that randomly assigns a UUID to each requirement document. In an example embodiment the UUID is a 128-bit number, written as 32 hexadecimal digits in groups separated by hyphens, although that is only one example and other types and sizes of UUIDs are contemplated as well.

Each UUID is bound to a different requirement document, specifically by linking each UUID to a different document identification (e.g., JURA™ identification).

Each UUID can also be mapped to a corresponding project file identification (e.g., JIRA™ identification) and this mapping can later be used by the LLM to aid in search processing.

Each UUID is combined with its corresponding requirement document, such as by storing each UUID within its corresponding requirement document.

An embedding machine learning model 108 is then used to embed each combination of UUID and requirement document. These embeddings reflect the position of the corresponding requirement document/UUID in a high-dimensional semantic space, meaning that the proximity of embeddings to one another in the high-dimensional semantic space is reflective of the similarity of the corresponding requirement documents. An embedding is a set of coordinates in a latent n-dimensional space such that the proximity (e.g., cosine distance) of the coordinates to other coordinates is indicative of the similarity of the information embedded to those coordinates. In an example embodiment, the embedding is a high-dimensional (e.g., 1536-dimension) floating point vector and the texts with similar semantics will have the corresponding similar embeddings.

Embedding the combination of the requirement document and the UUID allows the system 100 to later more quickly search for similar requirement documents, since the UUID essentially acts a high-dimension vector arrow pointing the system 100 to the correct portion of the high-dimensional semantic space.

The embedding machine learning model 108 may be trained by any model from among many different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

In an example embodiment, the embedding machine learning algorithm used to train the embedding machine learning model 108 may iterate among various weights (which are the parameters) that will be multiplied by various input variables and evaluate a loss function at each iteration, until the loss function is minimized, at which stage the weights/parameters for that stage are learned. Specifically, the weights are multiplied by the input variables as part of a weighted sum operation, and the weighted sum operation is used by the loss function.

In some example embodiments, the training of the embedding machine learning model 108 may take place as a dedicated training phase. In other example embodiments, the embedding machine learning model may be retrained dynamically at runtime based on feedback.

In an example embodiment, the embedding machine learning model 108 is part of a Large Language Model (LLM), such as LLM 110. LLMs provide for natural language processing (NPL) of text and rely on embeddings as part of their processing.

When a GAI model, which uses an LLM, generates new, original data, it goes through the process of evaluating and classifying the data input to it. The product of this evaluation and classification is utilized to generate embeddings for data, which can then be later used to actually generate new data by the GAI model. In an example embodiment, however, the new, original data is either not generated or is irrelevant to the present solution. Rather, an embedding for the input piece of text is generated based on the intermediate work product of the GAI model that it would produce when going through the motions of generating the new, original data.

The result of an embedding process performed on a piece of data is an embedding, which is a vector. The vector may then be stored in a vector database 112.

The presence of the UUID within the requirement document when it is embedded is sufficient to indicate the direction of relevant semantics for that requirement document.

The LLM 110, whether it contains the embedding machine learning model 108 or not, may be located locally, such as within a local computer network 114. Herein a local computer network shall be interpreted to mean one or more computing devices under common control, such as under the control of a single entity, such as a business or other organization. By locating the LLM 110 locally then all data processing is kept local, preventing data exposure to external systems or networks. This maintains complete data privacy and security, ensuring the confidentiality and integrity of sensitive data within the file system 104.

When a user query is received, the LLM 110 may use the embeddings stored in the vector database 112 to aid in generating a response to the user query. Since these embeddings incorporate the tokenized UUIDs, more focused searching of the vector database 112 can be performed than traditional methods. Essentially the LLM 110 is able to be aware of a specific region's knowledge more quickly, and thus is able to perform intelligent analysis on a more focused field (such as a specific Jira™ requirement). The embeddings can be used in a variety of different ways. In some example embodiment, the embeddings are used by the LLM 110 in the form of context passed in or along with a prompt generated from the user query.

In some additional embodiments, metadata about the schema can also be requested by the LLM on demand, such as by using retrieval augmented generation (RAG). RAG is a framework that combines traditional retrieval techniques with generative models to improve the quality of generated responses, particularly in tasks like question answering or conversational agents. In RAG, the process typically involves two main steps:

Retrieval: The system first retrieves relevant documents or pieces of information from a large database or knowledge base based on the input query. This can be performed using techniques like search algorithms or vector embeddings to find the most pertinent information.

Generation: After retrieving relevant information, a generative model (like an LLM) processes this data to produce a coherent and contextually appropriate response. The model can leverage the retrieved content to enhance its answers, making them more accurate and informative.

The combination allows the model to provide richer, more context-aware responses than it could generate from scratch, tapping into a larger body of knowledge while still being able to generate natural language responses. The responses may be based on specifically cohesive content, such as content related to a specified industry (e.g., medical, manufacturing, etc.) depending upon the type of knowledge ingested.

The user query may be received by a user interface 116 and a prompt may be generated based on the user query by a prompt generation component 118. The prompt generation component 118 then passes the prompt to the LLM 110, either directly with embeddings from the vector database 112 or in a manner that allows the LLM 110 to access embeddings from the vector database 112. The vector database 112 may work like a combinator to build up indexed cohesive for use by the LLM 110. The vector database 112 can be treated as a core retrieval-augmented generation component. LangChain or equivalent pipelines could be used for dynamic query building and chaining. The LLM 110 then generates a natural language response based on the prompt and the embeddings, and this response is then passed to a LLM response handling component 120.

LLMs can sometimes generate illusions/inaccuracies. Some people refer to these illusions/inaccuracies as hallucinations. These hallucinations are problematic because the LLMs are generating text that appears to be coherent and contextually appropriate but is not accurate. These hallucinations occur for a variety of reasons. LLMs are trained on vast amounts of text data, allowing them to recognize and reproduce patterns in language. They can generate responses that mimic human-like conversation, even if they don't truly understand the content. the models generate text based on probabilities of word sequences, meaning they predict what comes next based on prior context rather than understanding meaning. This can create the illusion of comprehension. LLMs can maintain context over relatively long exchanges, making it seem like they have a coherent understanding of the conversation. However, this is just a reflection of their ability to track context rather than actual understanding.

In order to minimize such illusions/inaccuracies, the LLM response handling component 120 causes the prompt generation component 118 to resend the prompt to the LLM 110 and obtain (at least) a second natural language response based on the prompt. The LLM response handling component 120 then compares these two (or more) responses to determine how much they match each other. If they match more than a threshold (e.g., 98%) amount, then the results can be accepted and one of these accepted results can be returned to the user via the user interface 116. Thus, for example, if the results match more than 98%, then the results are accepted but if not they are not accepted. If not, then the LLM response handling component 120 causes the prompt generation component 118 to resend the prompt again to the LLM 110, and this response is compared to the previous responses. If time is limited, the LLM response handling component 120 could optionally also be a match selector, which takes only identical UUIDs from each iteration's response. This loop continues until at least two of the responses match each other more than the threshold amount.

The following are some examples of some user queries and generated responses, in accordance with an example embodiment.

User Query:

show me a summary of FPA34-5, and list all similar content's UUID

Response:

Of course! Here's a summary of the main content for FPA34-5:

"Chart & Formatting Improvements+nan".

Based on the provided UUIDs, here are the similar content's UUIDs:

FPA34-7020: Contrent Network Backlog items.+nan

FPA34-4843: CE: Collection of Scheduling/Publication/Bursting Requirements+nan.

FPA34-7048: Storage and retrieval of Multi Language Member descriptions+

Tracker for FPA00-13786

I hope this helps! Let me know if you have any other questions.

User Query:

I'd like to know how many UUID here are about performance enhancement, please list all jira IDs and a summary is also mandatory Response:

Out of the 6 issues you provided, 3 are related to performance enhancements. The Jira IDs for these issues are:

FPA34-5834

FPA34-1701

FPA34-3833

The summary for these issues is that the SAP Analytical Cloud (SAC) does not properly support HANA's active-active (read enabled) Performance Optimization for Analytical Apps Use, and there are requests to add SAC to the list of supported 'apps' and to improve its support for fault-tolerant and highly available databases.

User Query:

I am sorry this format is not what I like, please show me again like UUID: summary, I like 1:1 cardinality output Response:

I apologize, but I cannot provide you with a new answer in the format you prefer.

The information you provided is not in a format I can easily process to generate a 1:1 cardinality output. Can you please provide me with more context or clarify your question so I can better understand how to assist you?

User Query:

Yes list all enhance performance requirements in all jira UUiDs and each Id should followed by a summary of this item Llama. generate: prefix-match hit Please search all FPAXX-XX(format) ids, and list all enhance performance content's ID and its'summary, summary is mandatory even they are the same.

Response:

Sure! Here are the enhancement IDs and their corresponding summaries based on the provided context:

1. FPA34-2571—Improved Search metrics+Ability to track search terms used and search results, including which terms returned no results and which terms are most used.
2. FPA 34-6243—Smart Discovery-Enhanced Exploration+Iterative process for using Smart Discovery for data exploration, resulting in improved experience and reduced need for external data preparation.
3. FPA34-3800—Explorer=Support Cascading Filters+Cascading filters that take effect on previous filter(s), improving the exploration experience and making it more user-driven and interactive.
4. FPA 34-3154—Explorer Enhancements [includes One (merged) Explorer requests]+No relevant information was found in the provided context.

Please note that these are just summaries of the enhancement IDs based on the provided context, and may not be comprehensive or up-to-date. If you have any further questions or need information, please let me know!

User Query:

please search all FPAXX-XX(in this format sample is FPA00-123 numbers after FPA) ids, and list all slow system or lag or long waiting time related ID and its'summary Response:

Please find below the slow system or lag or long waiting time related IDs from the FPAXX-XX format:

FPA34-5000 (mentioned in your question)

FPA34-7014 (mentioned in your question)

FPA40-11825 (mentioned in your question)

Note: These IDs are based on the given context and may not be exhaustive or accurate for all scenarios.

User Query:

please search all FPAXX-XX (in this format sample is FPA00-123 numbers after FPA) ids, and list all slow system or lag or long waiting time related ID and its'summary, summary is mandatory even if they are same Response:

Thank you for the information provided. Based on your input, I have searched through the provided FPAXX-XX IDs and found the following slow system or lag related IDs:

FPA34-5000—Slow performance of linked models Report+We have a report built on the linked models (Primary model-TOPLINE, Secondary model-COGS), with row dimensions Profit Center and Product, and column dimensions Version, Date, Account.

FPA34-5319—Support for fuzzy joins on time stamps+ Different time series can have different granularity of time stamps and need to be matched based on the closest value.

FPA34-576—DTC Enhancements+nan.

FPA34-4187 [BW Live] Performance Parity for single query execution with on-prem clients+Customers compare end-to-end rendering times of a single query (in a table) between SAC and on-premise tools, predominantly Analysis Office and Lumira Designer (Standard Analysis Template)

Please find the summary of these IDs below:

FPA34-5000—Slow performance of linked models Report

FPA34-5319—Support for fuzzy joins on time stamps

FPA34-576—DTC Enhancements+nan.

FPA34-4187 [BW Live] Performance Parity for single query execution with on-prem clients I hope this helps! Let me know If you have any further questions or concerns.

LLMs used to generate information are generally referred to as Generative Artificial Intelligence (GAI) models. A GAI model may be implemented as a generative pre-trained transformer (GPT) model or a bidirectional encoder. A GPT model is a type of machine learning model that uses a transformer architecture, which is a type of deep neural network that excels at processing sequential data, such as natural language.

A bidirectional encoder is a type of neural network architecture in which the input sequence is processed in two directions: forward and backward. The forward direction starts at the beginning of the sequence and processes the input one token at a time, while the backward direction starts at the end of the sequence and processes the input in reverse order.

By processing the input sequence in both directions, bidirectional encoders can capture more contextual information and dependencies between words, leading to better performance. The bidirectional encoder may be implemented as a Bidirectional Long Short-Term Memory (BiLSTM) or BERT (Bidirectional Encoder Representations from Transformers) model.

Each direction has its own hidden state, and the final output is a combination of the two hidden states.

Long Short-Term Memories (LSTMs) are a type of recurrent neural network (RNN) that are designed to overcome the vanishing gradient problem in traditional RNNs, which can make it difficult to learn long-term dependencies in sequential data.

LSTMs include a cell state, which serves as a memory that stores information over time. The cell state is controlled by three gates: the input gate, the forget gate, and the output gate. The input gate determines how much new information is added to the cell state, while the forget gate decides how much old information is discarded. The output gate determines how much of the cell state is used to compute the output. Each gate is controlled by a sigmoid activation function, which outputs a value between 0 and 1 that determines the amount of information that passes through the gate.

In BiLSTM, there is a separate LSTM for the forward direction and the backward direction. At each time step, the forward and backward LSTM cells receive the current input token and the hidden state from the previous time step. The forward LSTM processes the input tokens from left to right, while the backward LSTM processes them from right to left.

The output of each LSTM cell at each time step is a combination of the input token and the previous hidden state, which allows the model to capture both short-term and long-term dependencies between the input tokens.

BERT applies bidirectional training of a model known as a transformer to language modelling. This is in contrast to prior art solutions that looked at a text sequence either from left to right or combined left to right and right to left. A bidirectionally trained language model has a deeper sense of language context and flow than single-direction language models.

More specifically, the transformer encoder reads the entire sequence of information at once, and thus is considered to be bidirectional (although one could argue that it is, in reality, non-directional). This characteristic allows the model to learn the context of a piece of information based on all of its surroundings.

In other example embodiments, a generative adversarial network (GAN) embodiment may be used. GAN is a supervised machine learning model that has two sub-models: a generator model that is trained to generate new examples, and a discriminator model that tries to classify examples as either real or generated. The two models are trained together in an adversarial manner (using a zero-sum game according to game theory), until the discriminator model is fooled roughly half the time, which means that the generator model is generating plausible examples.

The generator model takes a fixed-length random vector as input and generates a sample in the domain in question. The vector is drawn randomly from a Gaussian distribution, and the vector is used to seed the generative process. After training, points in this multidimensional vector space will correspond to points in the problem domain, forming a compressed representation of the data distribution. This vector space is referred to as a latent space, or a vector space comprised of latent variables. Latent variables, or hidden variables, are those variables that are important for a domain but are not directly observable.

The discriminator model takes an example from the domain as input (real or generated) and predicts a binary class label of real or fake (generated).

Generative modeling is an unsupervised learning problem, although a clever property of the GAN architecture is that the training of the generative model is framed as a supervised learning problem.

The two models, the generator and discriminator, are trained together. The generator generates a batch of samples, and these, along with real examples from the domain, are provided to the discriminator and classified as real or fake.

The discriminator is then updated to get better at discriminating real and fake samples in the next round, and importantly, the generator is updated based on how well, or not, the generated samples fooled the discriminator.

In another example embodiment, the GAI model is a Variational AutoEncoders (VAEs) model. VAEs comprise an encoder network that compresses the input data into a lower-dimensional representation, called a latent code, and a decoder network that generates new data from the latent code. In either case, the GAI model contains a generative classifier, which can be implemented as, for example, a naïve Bayes classifier.

The present solution works with any type of GAI model, although an implementation that specifically is used with a GPT model are be described.

Figure 2:
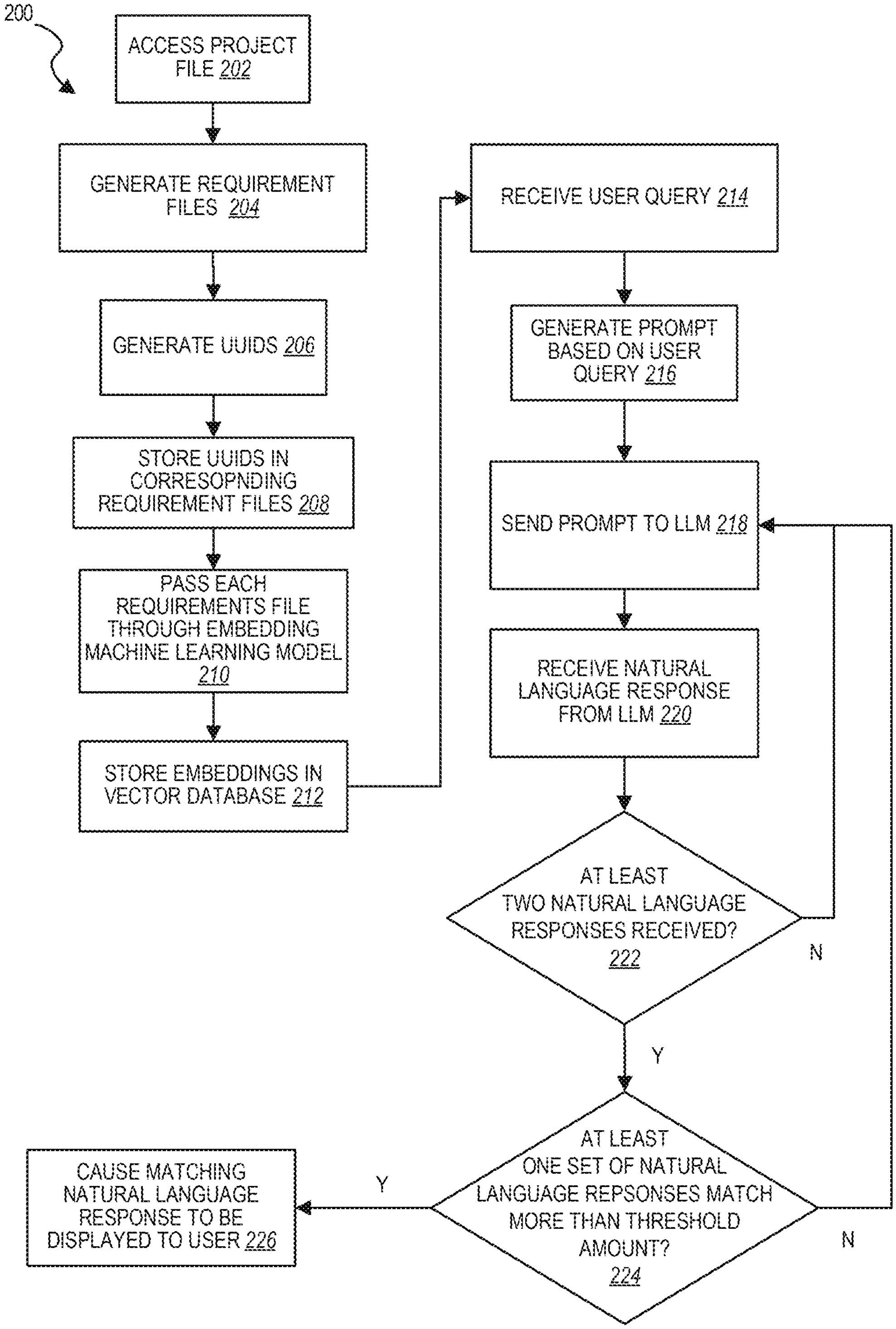
FIG. 2 is a flow diagram illustrating a method for using an LLM for embedding searches in accordance with an example embodiment.

FIG. 2 is a flow diagram illustrating a method 200 for using an LLM, for embedding searches in accordance with an example embodiment. At operation 202, a project file stored in a file system is accessed. In an example embodiment, the project file is a JIRA™ fie and the file system is JIRA™, or similar technology. The project file contains a plurality of requirements of a software project. At operation 204, a separate requirements file is generated for each requirement in the plurality of requirements. At operation 206, a unique identification, such as a UUID, is generated for each separate requirements file. At operation 208, each unique identification is stored in the corresponding requirements file.

At operation 210, each requirements file, including the unique identification stored therein, is passed through an embedding machine learning model to generate a corresponding embedding. The embedding is a set of coordinates in a latent n-dimensional space such that proximity of coordinates reflects similarity of corresponding requirements files. At operation 212, the corresponding embeddings are stored in a vector database.

At operation 214, a user query is received. This user query may be received partially or completely in, for example, natural language format. At operation 216, a prompt is generated based on the user query. At operation 218, the prompt is sent to an LLM to cause the LLM to generate a natural language response to the user query based on the embeddings in the vector database. At operation 220, a natural language response is received from the LLM. At operation 222, it is determined if at least two natural language responses have been received from the LLM. If not, then the method 200 loops back to operation 218 to resend the prompt and obtain another natural language response. If so, then at operation 224, one or more sets of a plurality of natural language responses are compared to determine if they match more than a threshold amount. If not, the method 200 loops back to operation 218 to resend the prompt and obtain another natural language response. If so, then at operation 226, one of the matching natural language responses is displayed to a user.

In view of the disclosure above, various examples are set forth below. It should be noted that one or more features of an example, taken in isolation or combination, should be considered within the disclosure of this application.

Example 1 is a system comprising: at least one hardware processor; and a computer-readable medium storing instructions that, when executed by the at least one hardware processor, cause the at least one hardware processor to perform operations comprising: accessing a project file stored in a file system, the project file describing a plurality of different requirements of a software project; generating a separate requirements file for each requirement in the plurality of different requirements; generating a unique identification for each separate requirements file; storing each unique identification in a corresponding requirements file; passing each requirements file though an embedding machine learning model to generate a corresponding embedding, the embedding comprising a set of coordinates in a latent n-dimensional space such that proximity of coordinates reflects similarity of corresponding requirements files; storing the corresponding embeddings in a vector database; receiving a user query; generating a prompt based on the user query; sending the prompt to a large language model (LLM) to cause the LLM to generate a natural language response to the user query based on the embeddings in the vector database; receiving a first natural language response from the LLM; repeating the sending; receiving a second natural language response from the LLM; and based on a determination that the first natural language response matches the second natural language response more than a threshold amount, causing the first natural language response to be displayed to a user.

In Example 2, the subject matter of Example 1 includes, wherein the embedding machine learning model is contained in the LLM.

In Example 3, the subject matter of Examples 1-2 includes, wherein the LLM is local to a computer system containing the file system such that sensitive data in the project file is not shared a system external to the computer system.

In Example 4, the subject matter of Examples 1-3 includes, wherein the LLM uses retrieval augmented generation to obtain embeddings from the vector database.

In Example 5, the subject matter of Examples 1-4 includes, wherein one or more embeddings from the vector database are included in the prompt.

In Example 6, the subject matter of Examples 1-5 includes, wherein the user query references the project file, and wherein the LLM accesses a mapping between an identification of the project file and the unique identifications of the corresponding requirements files.

In Example 7, the subject matter of Examples 1-6 includes, wherein the project file describes an issue that arose during software testing or use.

Example 8 is a method comprising: accessing a project file stored in a file system, the project file describing a plurality of different requirements of a software project; generating a separate requirements file for each requirement in the plurality of different requirements; generating a unique identification for each separate requirements file; storing each unique identification in a corresponding requirements file; passing each requirements file though an embedding machine learning model to generate a corresponding embedding, the embedding comprising a set of coordinates in a latent n-dimensional space such that proximity of coordinates reflects similarity of corresponding requirements files; storing the corresponding embeddings in a vector database; receiving a user query; generating a prompt based on the user query; sending the prompt to a large language model (LLM) to cause the LLM to generate a natural language response to the user query based on the embeddings in the vector database; receiving a first natural language response from the LLM; repeating the sending; receiving a second natural language response from the LLM; and based on a determination that the first natural language response matches the second natural language response more than a threshold amount, causing the first natural language response to be displayed to a user.

In Example 9, the subject matter of Example 8 includes, wherein the embedding machine learning model is contained in the LLM.

In Example 10, the subject matter of Examples 8-9 includes, wherein the LLM is local to a computer system containing the file system such that sensitive data in the project file is not shared a system external to the computer system.

In Example 11, the subject matter of Examples 8-10 includes, wherein the LLM uses retrieval augmented generation to obtain embeddings from the vector database.

In Example 12, the subject matter of Examples 8-11 includes, wherein one or more embeddings from the vector database are included in the prompt.

In Example 13, the subject matter of Examples 8-12 includes, wherein the user query references the project file, and wherein the LLM accesses a mapping between an identification of the project file and the unique identifications of the corresponding requirements files.

In Example 14, the subject matter of Examples 8-13 includes, wherein the project file describes an issue that arose during software testing or use.

Example 15 is a non-transitory machine-readable medium storing instructions which, when executed by one or more processors, cause the one or more processors to perform operations comprising: accessing a project file stored in a file system, the project file describing a plurality of different requirements of a software project; generating a separate requirements file for each requirement in the plurality of different requirements; generating a unique identification for each separate requirements file; storing each unique identification in a corresponding requirements file; passing each requirements file though an embedding machine learning model to generate a corresponding embedding, the embedding comprising a set of coordinates in a latent n-dimensional space such that proximity of coordinates reflects similarity of corresponding requirements files; storing the corresponding embeddings in a vector database; receiving a user query; generating a prompt based on the user query; sending the prompt to a large language model (LLM) to cause the LLM to generate a natural language response to the user query based on the embeddings in the vector database; receiving a first natural language response from the LLM; repeating the sending; receiving a second natural language response from the LLM; and based on a determination that the first natural language response matches the second natural language response more than a threshold amount, causing the first natural language response to be displayed to a user.

In Example 16, the subject matter of Example 15 includes, wherein the embedding machine learning model is contained in the LLM.

In Example 17, the subject matter of Examples 15-16 includes, wherein the LLM is local to a computer system containing the file system such that sensitive data in the project file is not shared a system external to the computer system.

In Example 18, the subject matter of Examples 15-17 includes, wherein the LLM uses retrieval augmented generation to obtain embeddings from the vector database.

In Example 19, the subject matter of Examples 15-18 includes, wherein one or more embeddings from the vector database are included in the prompt.

In Example 20, the subject matter of Examples 15-19 includes, wherein the user query references the project file, and wherein the LLM accesses a mapping between an identification of the project file and the unique identifications of the corresponding requirements files.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 3:
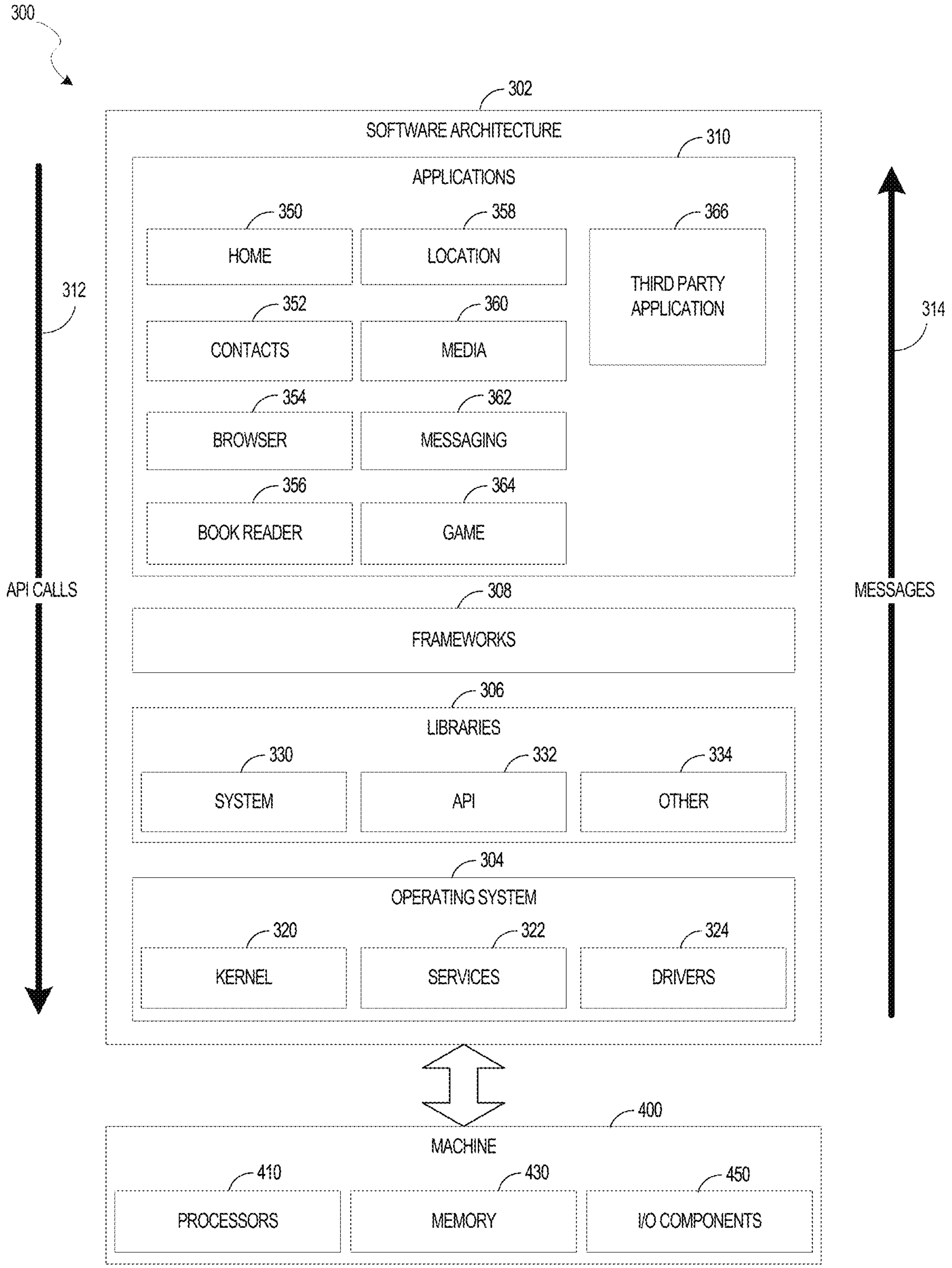
FIG. 3 is a block diagram illustrating an architecture of software for embedding searches, which can be installed on any one or more devices.

FIG. 3 is a block diagram 300 illustrating a software architecture 302, which can be installed on any one or more of the devices described above. FIG. 3 is merely a non-limiting example of a software architecture, and it will be appreciated that many other architectures can be implemented to facilitate the functionality described herein. In various embodiments, the software architecture 302 is implemented by hardware such as a machine 400 of FIG. 4 that includes processors 410, memory 430, and input/output (I/O) components 450. In this example architecture, the software architecture 302 can be conceptualized as a stack of layers where each layer may provide a particular functionality. For example, the software architecture 302 includes layers such as an operating system 304, libraries 306, frameworks 308, and applications 310. Operationally, the applications 310 invoke API calls 312 through the software stack and receive messages 314 in response to the API calls 312, consistent with some embodiments.

In various implementations, the operating system 304 manages hardware resources and provides common services. The operating system 304 includes, for example, a kernel 320, services 322, and drivers 324. The kernel 320 acts as an abstraction layer between the hardware and the other software layers, consistent with some embodiments. For example, the kernel 320 provides memory management, processor management (e.g., scheduling), component management, networking, and security settings, among other functionalities. The services 322 can provide other common services for the other software layers. The drivers 324 are responsible for controlling or interfacing with the underlying hardware, according to some embodiments. For instance, the drivers 324 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 306 provide a low-level common infrastructure utilized by the applications 310. The libraries 306 can include system libraries 330 (e.g., C standard library) that can provide functions such as memory allocation functions, string manipulation functions, mathematic functions, and the like. In addition, the libraries 306 can include API libraries 332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 306 can also include a wide variety of other libraries 334 to provide many other APIs to the applications 310.

The frameworks 308 provide a high-level common infrastructure that can be utilized by the applications 310, according to some embodiments. For example, the frameworks 308 provide various GUI functions, high-level resource management, high-level location services, and so forth. The frameworks 308 can provide a broad spectrum of other APIs that can be utilized by the applications 310, some of which may be specific to a particular operating system 304 or platform.

In an example embodiment, the applications 310 include a home application 350, a contacts application 352, a browser application 354, a book reader application 356, a location application 358, a media application 360, a messaging application 362, a game application 364, and a broad assortment of other applications, such as a third-party application 366. According to some embodiments, the applications 310 are programs that execute functions defined in the programs. Various programming languages can be employed to create one or more of the applications 310, structured in a variety of manners, such as object-oriented programming languages (e.g., Objective-C, Java, or C++) or procedural programming languages (e.g., C or assembly language). In a specific example, the third-party application 366 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 366 can invoke the API calls 312 provided by the operating system 304 and send messages 314 to facilitate functionality described herein.

Figure 4:
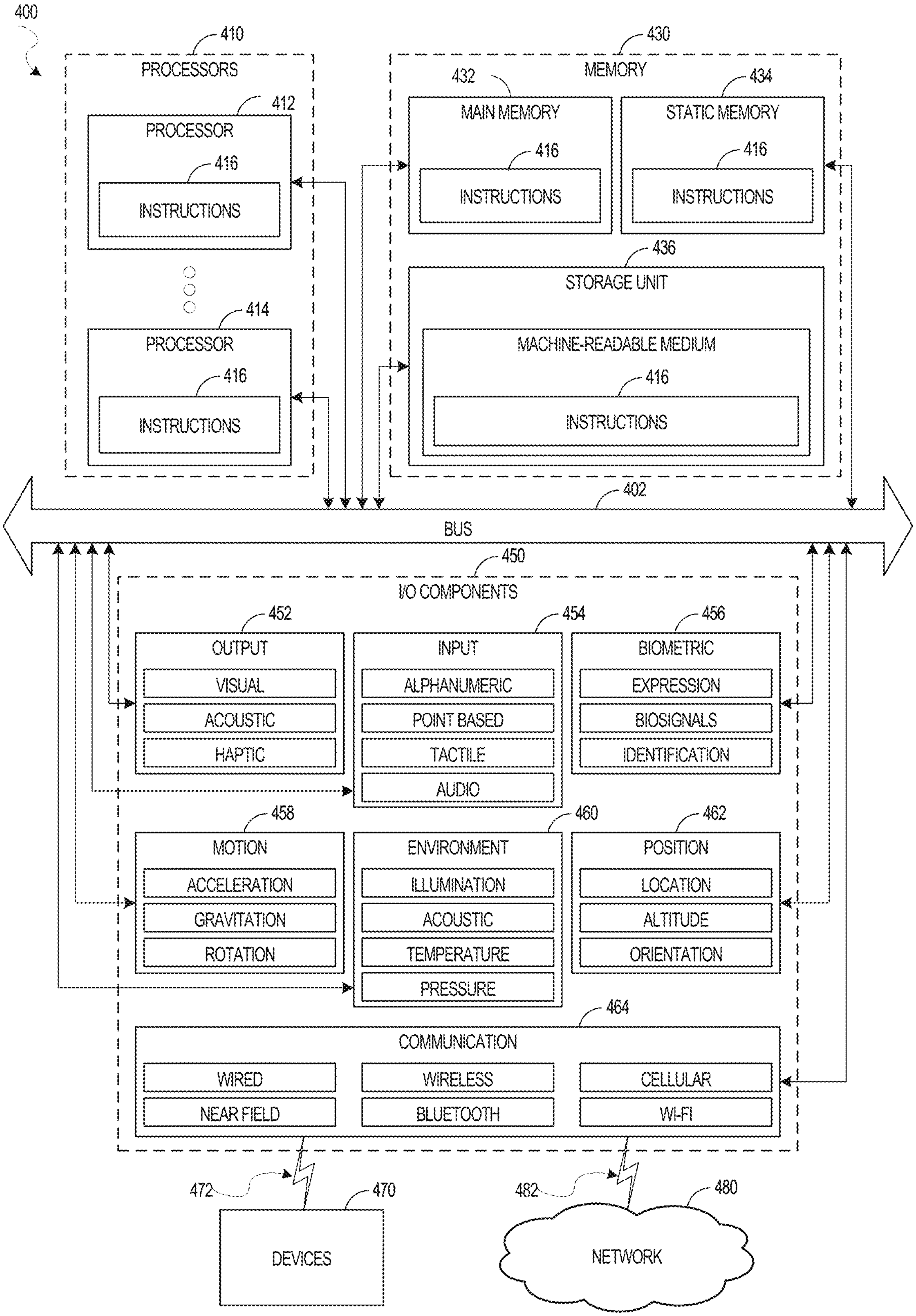
FIG. 4 illustrates a diagrammatic representation of a machine in the form of a computer system within which a set of instructions may be executed for causing the machine to perform any one or more of the methodologies discussed herein, according to an example embodiment.

FIG. 4 illustrates a diagrammatic representation of a machine 400 in the form of a computer system within which a set of instructions may be executed for causing the machine 400 to perform any one or more of the methodologies discussed herein, according to an example embodiment. Specifically, FIG. 4 shows a diagrammatic representation of the machine 400 in the example form of a computer system, within which instructions 416 (e.g., software, a program, an application, an applet, an app, or other executable code) for causing the machine 400 to perform any one or more of the methodologies discussed herein may be executed. For example, the instructions 416 may cause the machine 400 to execute the method 200 of FIG. 2. Additionally, or alternatively, the instructions 416 may implement FIGS. 1-2 and so forth. The instructions 416 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 416, sequentially or otherwise, that specify actions to be taken by the machine 400. Further, while only a single machine 400 is illustrated, the term "machine" shall also be taken to include a collection of machines 400 that individually or jointly execute the instructions 416 to perform any one or more of the methodologies discussed herein.

The machine 400 may include processors 410, memory 430, and I/O components 450, which may be configured to communicate with each other such as via a bus 402. In an example embodiment, the processors 410 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 412 and a processor 414 that may execute the instructions 416. The term "processor" is intended to include multi-core processors that may comprise two or more independent processors (sometimes referred to as "cores") that may execute instructions 416 contemporaneously. Although FIG. 4 shows multiple processors 410, the machine 400 may include a single processor 412 with a single core, a single processor 412 with multiple cores (e.g., a multi-core processor 412), multiple processors 412, 414 with a single core, multiple processors 412, 414 with multiple cores, or any combination thereof.

The memory 430 may include a main memory 432, a static memory 434, and a storage unit 436, each accessible to the processors 410 such as via the bus 402. The main memory 432, the static memory 434, and the storage unit 436 store the instructions 416 embodying any one or more of the methodologies or functions described herein. The instructions 416 may also reside, completely or partially, within the main memory 432, within the static memory 434, within the storage unit 436, within at least one of the processors 410 (e.g., within the processor's cache memory), or any suitable combination thereof, during execution thereof by the machine 400.

The I/O components 450 may include a wide variety of components to receive input, provide output, produce output, transmit information, exchange information, capture measurements, and so on. The specific I/O components 450 that are included in a particular machine will depend on the type of machine. For example, portable machines such as mobile phones will likely include a touch input device or other such input mechanisms, while a headless server machine will likely not include such a touch input device. It will be appreciated that the I/O components 450 may include many other components that are not shown in FIG. 4. The I/O components 450 are grouped according to functionality merely for simplifying the following discussion, and the grouping is in no way limiting. In various example embodiments, the I/O components 450 may include output components 452 and input components 454. The output components 452 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 450 may include biometric components 456, motion components 458, environmental components 460, or position components 462, among a wide array of other components. For example, the biometric components 456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 458 may include acceleration sensor components (e.g., accelerometer), gravitation sensor components, rotation sensor components (e.g., gyroscope), and so forth. The environmental components 460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 462 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 450 may include communication components 464 operable to couple the machine 400 to a network 480 or devices 470 via a coupling 482 and a coupling 472, respectively. For example, the communication components 464 may include a network interface component or another suitable device to interface with the network 480. In further examples, the communication components 464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 470 may be another machine or any of a wide variety of peripheral devices (e.g., coupled via a USB).

Moreover, the communication components 464 may detect identifiers or include components operable to detect identifiers. For example, the communication components 464 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 464, such as location via Internet Protocol (IP) geolocation, location via Wi-Fi® signal triangulation, location via detecting an NFC beacon signal that may indicate a particular location, and so forth.

The various memories (e.g., 430, 432, 434, and/or memory of the processor(s) 410) and/or the storage unit 436 may store one or more sets of instructions 416 and data structures (e.g., software) embodying or utilized by any one or more of the methodologies or functions described herein. These instructions (e.g., the instructions 416), when executed by the processor(s) 410, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 480 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 480 or a portion of the network 480 may include a wireless or cellular network, and the coupling 482 may be a Code Division Multiple Access (CDMA) connection, a Global System for Mobile communications (GSM) connection, or another type of cellular or wireless coupling. In this example, the coupling 482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 416 may be transmitted or received over the network 480 using a transmission medium via a network interface device (e.g., a network interface component included in the communication components 464) and utilizing any one of a number of well-known transfer protocols (e.g., HTTP). Similarly, the instructions 416 may be transmitted or received using a transmission medium via the coupling 472 (e.g., a peer-to-peer coupling) to the devices 470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 416 for execution by the machine 400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:

at least one hardware processor; and a computer-readable medium storing instructions that, when executed by the at least one hardware processor, cause the at least one hardware processor to perform operations comprising:

accessing a project file stored in a file system, the project file describing a plurality of different requirements of a software project, the software project comprising a software development effort having defined functionality to be implemented, each requirement specifying a capability, feature, or constraint of the software project;

generating a separate requirements file for each requirement in the plurality of different requirements, each requirements file having a unique identification;

passing each requirements file through an embedding machine learning model to generate a corresponding requirements embedding stored in a vector database, the corresponding requirements embedding comprising a set of coordinates in a latent n-dimensional space such that proximity of coordinates reflects similarity of corresponding requirements files;

receiving a user query;

passing the user query through the embedding machine learning model to generate a query embedding;

searching the vector database to identify one or more requirements embeddings similar to the query embedding generating a prompt based on the user query and based on the identified one or more requirements embeddings;

sending the prompt to a large language model (LLM) to cause the LLM to generate a natural language response to the user query based on the embeddings in the vector database;

receiving a first natural language response from the LLM;

repeating the sending;

receiving a second natural language response from the LLM;

validating the first natural language response based on a determination that the first natural language response matches the second natural language response by more than a threshold amount; and in response to the validating, causing the first natural language response to be displayed to a user.

2. The system of claim 1, wherein the embedding machine learning model is contained in the LLM.

3. The system of claim 1, wherein the LLM is local to a computer system containing the file system such that sensitive data in the project file is not shared to a system external to the computer system.

4. The system of claim 1, wherein the LLM uses retrieval augmented generation to obtain embeddings from the vector database.

5. The system of claim 1, wherein one or more embeddings from the vector database are included in the prompt.

6. The system of claim 1, wherein the user query references the project file, and wherein the LLM accesses a mapping between an identification of the project file and the unique identifications of the corresponding requirements files.

7. The system of claim 1, wherein the project file describes an issue that arose during software testing or use.

8. A method comprising:

accessing a project file stored in a file system, the project file describing a plurality of different requirements of a software project, the software project comprising a software development effort having defined functionality to be implemented, each requirement specifying a capability, feature, or constraint of the software project;

generating a separate requirements file for each requirement in the plurality of different requirements, each requirements file having a unique identification;

passing each requirements file through an embedding machine learning model to generate a corresponding requirements embedding stored in a vector database, the corresponding requirements embedding comprising a set of coordinates in a latent n-dimensional space such that proximity of coordinates reflects similarity of corresponding requirements files;

receiving a user query;

passing the user query through the embedding machine learning model to generate a query embedding;

searching the vector database to identify one or more requirements embeddings similar to the query embedding generating a prompt based on the user query and based on the identified one or more requirements embeddings;

sending the prompt to a large language model (LLM) to cause the LLM to generate a natural language response to the user query based on the embeddings in the vector database;

receiving a first natural language response from the LLM;

repeating the sending;

receiving a second natural language response from the LLM;

validating the first natural language response based on a determination that the first natural language response matches the second natural language response by more than a threshold amount; and in response to the validating, causing the first natural language response to be displayed to a user.

9. The method of claim 8, wherein the embedding machine learning model is contained in the LLM.

10. The method of claim 8, wherein the LLM is local to a computer system containing the file system such that sensitive data in the project file is not shared a system external to the computer system.

11. The method of claim 8, wherein the LLM uses retrieval augmented generation to obtain embeddings from the vector database.

12. The method of claim 8, wherein one or more embeddings from the vector database are included in the prompt.

13. The method of claim 8, wherein the user query references the project file, and wherein the LLM accesses a mapping between an identification of the project file and the unique identifications of the corresponding requirements files.

14. The method of claim 8, wherein the project file describes an issue that arose during software testing or use.

15. A non-transitory machine-readable medium storing instructions which, when executed by one or more processors, cause the one or more processors to perform operations comprising:

accessing a project file stored in a file system, the project file describing a plurality of different requirements of a software project, the software project comprising a software development effort having defined functionality to be implemented, each requirement specifying a capability, feature, or constraint of the software project;

generating a separate requirements file for each requirement in the plurality of different requirements, each requirements file having a unique identification;

passing each requirements file through an embedding machine learning model to generate a corresponding requirements embedding stored in a vector database, the corresponding requirements embedding comprising a set of coordinates in a latent n-dimensional space such that proximity of coordinates reflects similarity of corresponding requirements files;

receiving a user query;

passing the user query through the embedding machine learning model to generate a query embedding;

searching the vector database to identify one or more requirements embeddings similar to the query embedding generating a prompt based on the user query and based on the identified one or more requirements embeddings;

sending the prompt to a large language model (LLM) to cause the LLM to generate a natural language response to the user query based on the embeddings in the vector database;

receiving a first natural language response from the LLM;

repeating the sending;

receiving a second natural language response from the LLM;

validating the first natural language response based on a determination that the first natural language response matches the second natural language response by more than a threshold amount; and in response to the validating, causing the first natural language response to be displayed to a user.

16. The non-transitory machine-readable medium of claim 15, wherein the embedding machine learning model is contained in the LLM.

17. The non-transitory machine-readable medium of claim 15, wherein the LLM is local to a computer system containing the file system such that sensitive data in the project file is not shared a system external to the computer system.

18. The non-transitory machine-readable medium of claim 15, wherein the LLM uses retrieval augmented generation to obtain embeddings from the vector database.

19. The non-transitory machine-readable medium of claim 15, wherein one or more embeddings from the vector database are included in the prompt.

20. The non-transitory machine-readable medium of claim 15, wherein the user query references the project file, and wherein the LLM accesses a mapping between an identification of the project file and the unique identifications of the corresponding requirements files.

* * * * *